US006717655B2

(12) United States Patent
Cheng et al.

(10) Patent No.: US 6,717,655 B2
(45) Date of Patent: Apr. 6, 2004

(54) MICROPULSE LIDAR SYSTEM

(75) Inventors: Yuk Sun Andrew Cheng, North Point (HK); Yongkang Guo, Chengdu (CN); Jianhua Zhu, Chengdu (CN)

(73) Assignee: City University of Hong Kong, Hong Kong (CN)

( * ) Notice: Subject to any disclaimer, the term of this patent is extended or adjusted under 35 U.S.C. 154(b) by 0 days.

(21) Appl. No.: 10/173,139

(22) Filed: Jun. 17, 2002

(65) Prior Publication Data

US 2003/0016350 A1 Jan. 23, 2003

(30) Foreign Application Priority Data

Jun. 20, 2001 (CN) .......................... 1121982 U

(51) Int. Cl.[7] ................................ G01C 3/08
(52) U.S. Cl. .................... 356/4.01; 356/342; 356/5.01; 356/5.1
(58) Field of Search ................ 356/342, 5.01–5.15, 356/4.01

(56) References Cited

U.S. PATENT DOCUMENTS 3,781,552 A * 12/1973 Kadrmas
4,950,075 A * 8/1990 Ichinose et al.
5,793,478 A * 8/1998 Rader et al. .................. 356/28
6,141,085 A * 10/2000 Kato et al. ................. 356/4.01

OTHER PUBLICATIONS

Spinhirne, James D., "Micro Pulse Lidar," IEEE Transactions on Geoscience and Remote Sensing, 1993, 31(1), pp. 48–55.
Hwang, et al., "Micro Pulse Lidar for Aerosol and Cloud Measurement," Proc. SPIE on Lidar Atmospheric Monitoring, 1997, vol. 3104, pp. 39–42.

* cited by examiner

Primary Examiner—Stephen C. Buczinski
(74) Attorney, Agent, or Firm—Heslin Rothenberg Farley & Mesiti P.C.

(57) ABSTRACT

A micropulse lidar system is described that comprises, a laser light source for emitting a pulsed laser beam, beam shaping means for shaping the intensity distribution of said beam such that said beam has a substantially annular intensity distribution in cross-section, a Schmidt-Cassegrain telescope for transmitting the annular beam to an atmospheric target and for collecting backscattered light returned from said target, and means for detecting and analyzing said backscattered light. The system has higher efficiency and better signal-to-noise ratio than a corresponding system without the beam shaping means. There is also disclosed a method for optimising the design of the beam shaping means.

10 Claims, 8 Drawing Sheets

MICROPULSE LIDAR SYSTEM

FIELD OF THE INVENTION

This invention relates to a micropulse laser radar system, and in particular to such a system for use in automatic remote sensing and measurement of atmospheric aerosol concentration and cloud height.

BACKGROUND OF THE INVENTION

Laser radar systems, and in particular lidar (light detection and ranging) systems have a number of applications including atmospheric monitoring and measurements of cloud height and aerosol concentration. In such systems a laser pulse is transmitted to an atmospheric target, and back-scattered light from clouds and atmospheric aerosol concentrations is collected by a receiver and analysed to derive quantitative atmospheric parameters.

At present, conventional lidar systems usually employ pulse lasers with a relatively high pulse energy of 0.1 to 1 Joule and low pulse repetition rate of several tens of Hertz. However, this high pulse energy presents serious safety problems with regards to ground personnel and indeed potential safety problems with aircraft. It is therefore desirable to provide atmospheric lidar systems with a comparatively low pulse energy and a high pulse repetition rate. Such low-pulse energy systems, however, imply that to be effective the system must have high efficiency to be able to achieve reliable and accurate measurements.

PRIOR ART

FIG. 2 shows a lidar system according to the prior art as described in James D. Spinhirne, "Micro Pulse Lidar", IEEE Transactions on Geoscience and Remote Sensing, 1993, 31(1). pp48–55. As can be seen in FIG. 2, this system has a bipartite design with the optical transmitter and receiver units placed apart from each other. In this design a frequency doubled 532 nm laser beam from a diode pumped Nd:YLF laser is expanded and collimated before being transmitted to the atmospheric target. The back-scattered signal is collected by a Cassegrain telescope, filtered by a narrow bandwidth interference filter, then focused and directed to a Geiger avalanche photodiode detector. The photon counting signal is then acquired and stored in a personal computer for analysis.

A disadvantage of this system is that it is non-coaxial and requires independent optical transmitter and receiver units, which will increase the volume and weight of the apparatus, thus reducing its mobility. Mobility is an important practical aspect to such systems if they are to be able to produce useful experimental measurements over a wide geographic area. Furthermore, there will be an inevitable mismatch between the field-of-view of the optical transmitter and the field-of-view of the optical receiver. The spatial coupling area will change with field-of-view and detection distance and this will increase the complexity of the subsequent data processing when analyzing the data.

FIG. 3 shows another form of micropulse lidar system as described in I. H. Hwang, Sandor Lokos and Jan Kim, "Micro Pulse Lidar for Aerosol and Cloud Measurement" Proc. SPIE on Lidar Atmospheric Monitoring. 1997, Vol.3104, pp39–42. As shown in FIG. 3, this design is an integral system in which a Schmidt-Cassegrain telescope acts as both the optical transmitter and optical receiver. The laser beam from a frequency doubled 532 nm diode pumped Nd:YLF laser is coupled into the telescope, reflected by the second convex mirror and the primary concave mirror, and then transmitted to the atmospheric target. The backscattering return signal is then collected by the same telescope, filtered by an interference filter, focused by an optical lens, detected by an avalanche photodiode and finally captured by a multi-signal capture card for processing by a computer to obtain desired atmospheric information.

By using an integral coaxial transmitter and receiver, the drawbacks of the Spinhirne system are overcome. However, this system has its own disadvantages. Notably it is of a low energy efficiency. This is because the laser beam has a Gaussian distribution with a high intensity in the center of the beam, and low intensity at the edges of the beam. Unfortunately, however, this high-intensity central region is blocked by the second mirror of the Schmidt-Cassegrain telescope and does not contribute to the final transmitted pulses. This amounts to an energy loss of about 30–40%. In addition, the high-intensity central region which is blocked by the second mirror will be returned along the original light path and will generate strong background noise at the detector which will both increase the difficulty of detecting the backscattering signals, and in the long run will damage the detector.

SUMMARY OF THE INVENTION

According to the present invention there is provided a micropulse lidar system comprising, a laser light source for emitting a pulsed laser beam, beam shaping means for shaping the intensity distribution of said beam such that said beam has a substantially annular intensity distribution in cross-section, a Schmidt-Cassegrain telescope for transmitting the annular beam to an atmospheric target and for collecting backscattered light returned from said target, and means for detecting and analyzing said backscattered light.

Preferably the micropulse lidar system may further comprise beam expanding and collimating means located between said laser light source and said beam shaping means.

In a preferred embodiment of the invention the lidar system is one with a high pulse repetition rate and low pulse energy. For example the laser light source may emit pulses with a repetition rate of between 1 to 20 KHz and a pulse energy in the range of 1 to 50 µJ. For example the laser light source may be a Nd:YAG laser that emits light at 532 nm.

Viewed from another broad aspect the present invention provides a method for designing a diffractive optical element comprising optimizing the phase distribution of the diffractive optical element using a marginal phase correction method.

BRIEF DESCRIPTION OF THE DRAWINGS

An embodiment of the invention will now be described with reference to the accompanying drawings, in which.

DETAILED DESCRIPTION OF PREFERRED EMBODIMENTS

Figure 1:
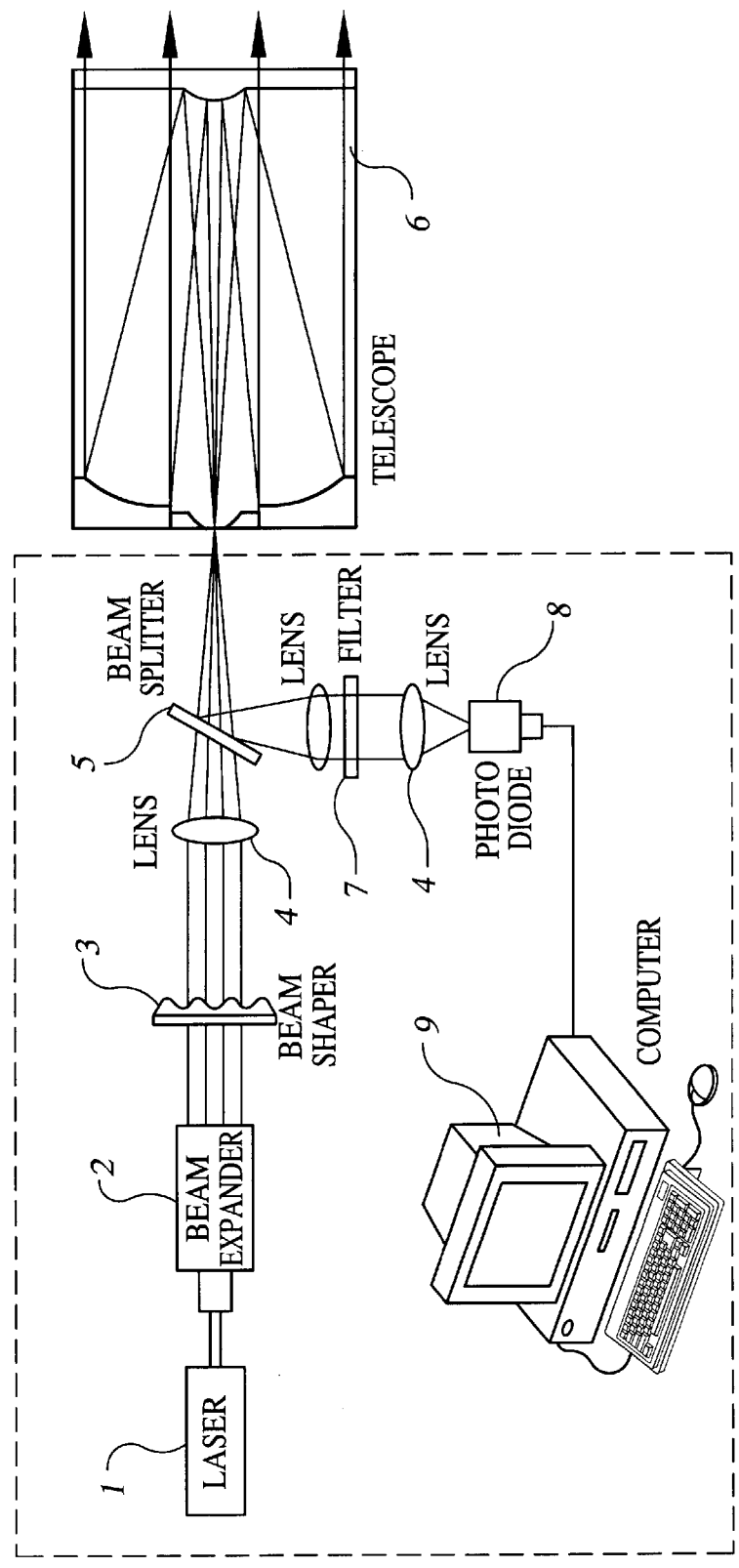
FIG. 1 is a schematic diagram showing an apparatus according to an embodiment of the present invention.
Figure 2:
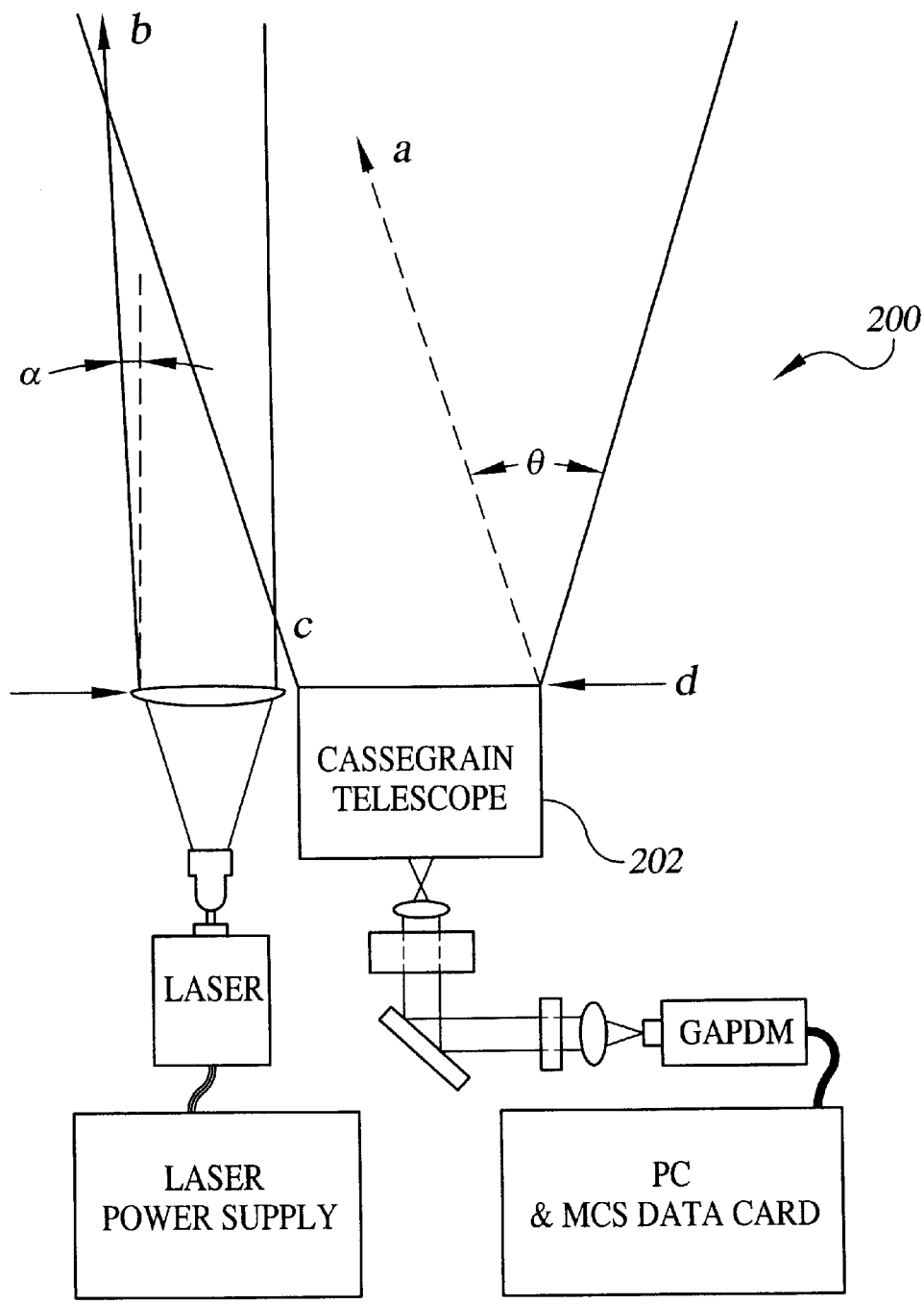
FIG. 2 is a schematic view showing an apparatus according to the prior art.
Figure 3:
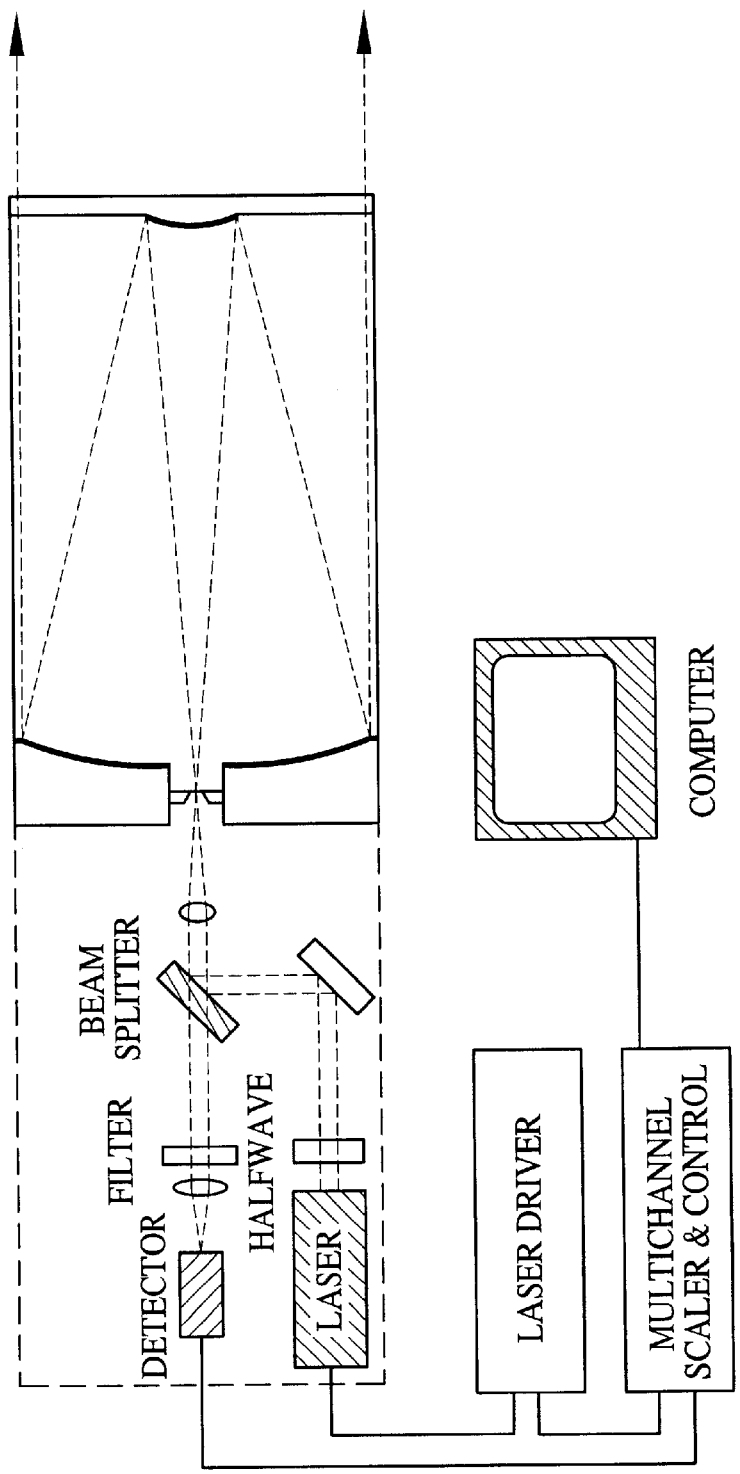
FIG. 3 is a schematic view showing another apparatus according to the prior art.
Figure 4:
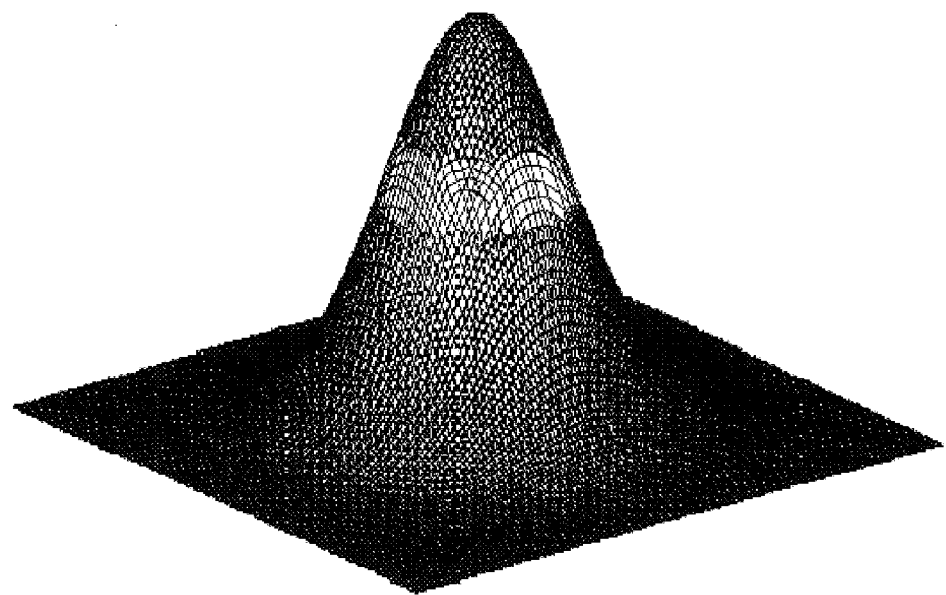
FIG. 4 illustrates the Gaussian intensity profile of the laser beam.
Figure 5:
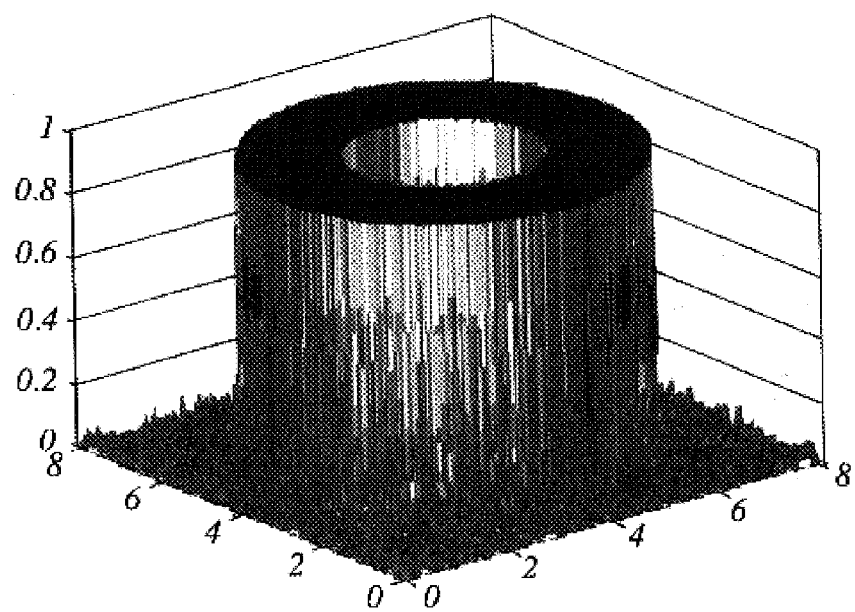
FIG. 5 illustrates the intensity profile of the laser beam after transformation in an embodiment of the present invention.
Figure 6:
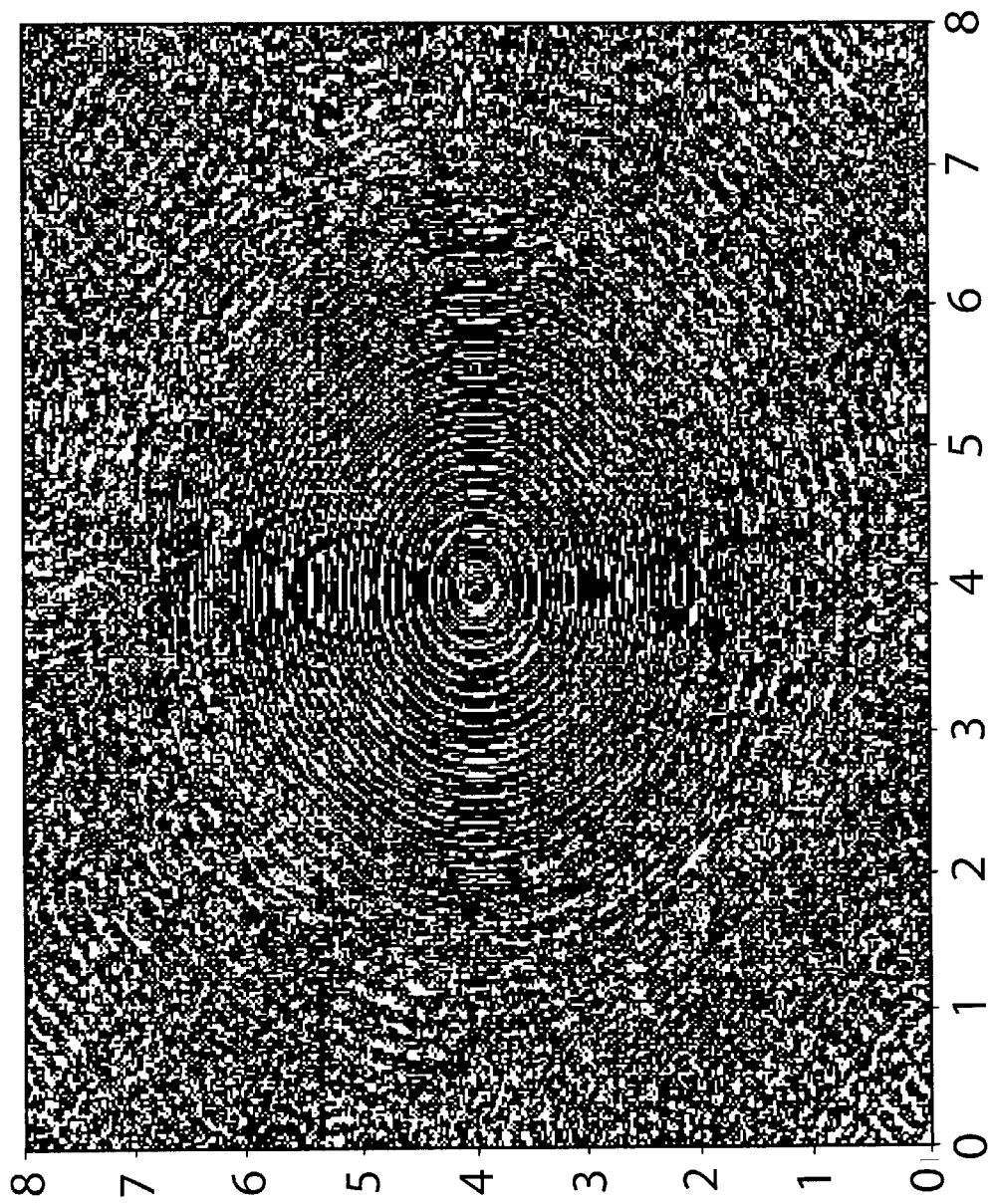
FIG. 6 illustrates the surface phase distribution of a beam-shaping element for use in an embodiment of the present invention.

Referring to FIG. 1 an apparatus according to an embodiment of the present invention is illustrated. The light source is a frequency doubled diode pumped Nd:YAG solid-state laser 1 that emits light at 532 nm. The pulse energy is 25 $\mu$J and the pulse repetition rate is 1 kHz. The laser pulses are expanded and collimated by a beam expander 2. At this stage the pulses have a Gaussian intensity profile, but this intensity profile is then transformed by passing the pulses through a micro-optical beam shaper 3 that is placed in front of a Fourier transformation lens. As will be explained in greater detail below, the purpose of the beam shaper 3 is to transform the intensity profile of the laser beam from a Gaussian distribution with a high-intensity in the center, to an annular profile with a generally uniform "flat-top" intensity in the edge regions of the beam and a very low or near zero intensity in the center of the beam. FIG. 6 illustrates the surface phase distribution of the beam shaper.

The transformed laser beam pulses are then passed to a Schmidt-Cassegrain telescope 6 through a focusing lens 4 and a polarized beam-splitter 5. Lens 4 is chosen to have an F number that matches the telescope 6 so as to focus and couple the pulses to the telescope with high-efficiency. The optics of the telescope will further expand the beam width so that the intensity is further reduced to enhance the safety of the pulses and the pulses are then transmitted to the atmospheric target.

The telescope 6 also collects the back-scattered returning signal from the target and the collected signal is then directed to an avalanche photodiode 8 by the beam-splitter 5, narrow-band interference filter 7 and a second focusing lens 4' identical to lens 4. Photodiode 8 generates an output signal which is then captured for further analysis and processing by computer 9 using a multi-channel signal capture card fitted in the computer. The computer 9 can then analyse the time-resolved signal to derive atmospheric parameters such as aerosol concentration distribution and cloud height structure. Three-dimensional large spatial scale atmospheric distribution parameters can be obtained by using the lidar system of the present invention to perform spatial multi-angle and multi-site scanning measurements.

One aspect of the present invention is the use of a beam shaper to change the radial intensity profile of the laser beam so as to increase the efficiency and signal-to-noise ratio of the lidar system using a Schmidt-Cassegrain telescope. Another aspect of the present invention is that a novel method is provided for optimizing the design of the beam shaper, and this novel method will now be described.

A first stage in the design process is the calculation of a mapping function using a ray tracing approach. This will be explained with reference to FIG. 7 in which a diffractive optical element (DOE) is illuminated with a Gaussian beam.

The intensity of the Gaussian beam at the DOE plane is given by $$P_i(r) = \begin{cases} \exp(-2r^2/r_0^2) & r \leq R_0 \\ 0 & r > R_0 \end{cases} \quad (1)$$

where $r_0$ is the $e^{-2}$ Gaussian beam radius. The intensity of desired ring-shaped beam is given by $$P_o(\rho) = \begin{cases} I_0 = const & \rho \in [\rho_1, \rho_2] \\ 0 & \rho \notin [\rho_1, \rho_2] \end{cases} \quad (2)$$

Figure 7:
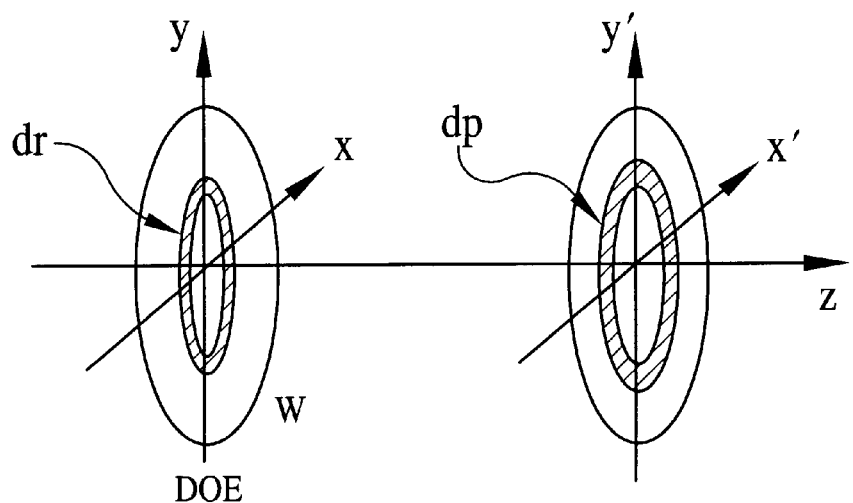
FIG. 7 illustrates the geometry used in the design of the beam shaper.

The geometry of the ray tracing for the beam shaping is shown in FIG. 7. It is assumed that a light field of Fresnel diffraction at an arbitrary annulus of desired profile can be treated as being the result of the pure interference of light beams from the corresponding local annulus of an axially symmetric wave front. Then energies contained in the infinitesimal annulus dr of illuminating beam and in the infinitesimal annulus dp of desired shaped beam are equated $$\int_r^{r+dr} 2\pi r P_i(r) dr = \int_\rho^{\rho+d\rho} 2\pi \rho P_o(\rho) d\rho \quad (3)$$

An integration of equation (3) over the whole aperture expresses the equality of energy of illuminating distribution with that collected in the desired shaped plane $$\int_{r_1}^{r_2} 2\pi r P_i(r) dr = \int_{\rho_1}^{\rho_2} 2\pi \rho P_o(\rho) d\rho \quad (4)$$

And the integration of equation (2) over the part of aperture yields $$\int_{r_1}^{r} 2\pi r P_i(r) dr = \int_{\rho_1}^{\rho(r)} 2\pi \rho P_o(\rho) d\rho \quad (5)$$

Substituting Eqs. (1) and (2) into expression (4) and integrating over the whole input aperture, we find the value of $I_0$. Thereafter, repeating the integration of expression (5) gives the following equation $$\rho(r) = \sqrt{\frac{(\rho_2^2 - \rho_1^2)[1 - \exp(-2r^2/r_0^2)]}{1 - \exp(-2R_0^2/r_0^2)} + \rho_1^2} \quad (6)$$

The phase distribution of the DOE may now be calculated. Taking into account that the derivative of the element's phase function $\phi(r)$ is equal to its corresponding cosine, and that in the paraxial approximation its cosine can be written as (p r)/z the following ray equation is obtained $$\frac{d\varphi(r)}{dr} = k\frac{\rho(r) - r}{z} \quad (7)$$

where $k=2\pi/\lambda$, $\lambda$ is the light wavelength. Therefore, the phase distribution of DOE is obtained as:

$$\varphi(r) = \frac{k}{z}\left[\left(-\frac{1}{2}r^2\right) + \int_{r_1}^{r} \rho(r) dr\right] \quad (8)$$

Unfortunately, the equation (8) does not provide an analytical solution. Since it is an ordinary integration, its numerical solution may readily be obtained at some given point.

The phase distribution may now be optimized by using a marginal phase correction method. The assumptions adopted in ray tracing approach entail the following. The input intensity distribution $P_i(r)$ and the phase distribution $\phi(r)/k$ are slowly varying functions, and the output intensity function $P_0(\rho)$ is considered a slowly varying profile, excluding the marginal portions that is usually desired to have sharp slopes. But since the steepness of $P_0(\rho)$ slopes (i.e., $dP_0(\rho)/d\rho$) will always be restricted by the diffraction divergence inherent in the optical system, obtaining the ultimate steepness would give rise to severe oscillations of $P_0(\rho)$, especially in the regions surrounding the slopes. To remove the oscillations, marginal smoothing of $P_0(\rho)$ should be carried out to reduce diffraction effects and avoid oscillations of the intensity $P_0(\rho)$.

Figure 8:
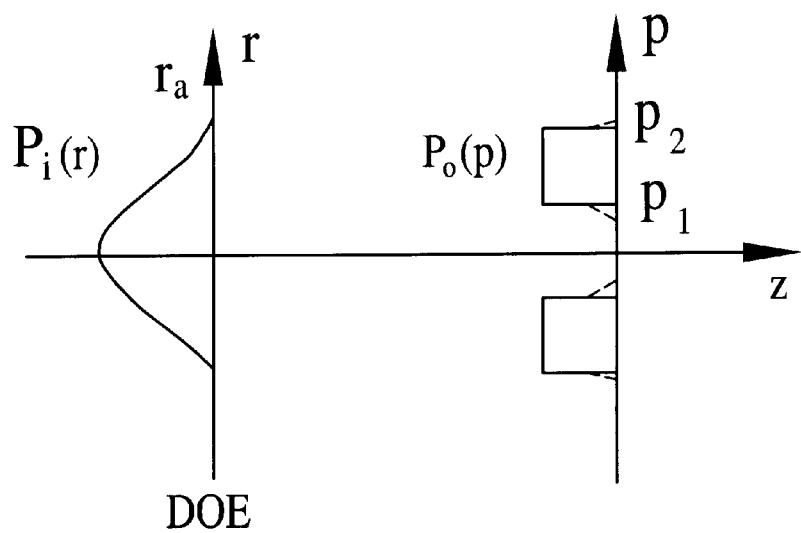
FIG. 8 illustrates schematically the concept of smoothing the intensity profile, FIGS. 9(a) and (b) illustrate radial amplitude distributions using beam shapers designed using known techniques.

This can be realized by a slight extra broadening of the desired edge slopes of $P_0(\rho)$, which is shown in FIG. 8, when the directions of near central (r 0) and outer (r $r_a$) rays emerging from the DOE are properly changed by a slight correction of the phase function of the DOE. Corrective phase functions $\phi^{cor}(r)$ can be proposed for appropriate extra broadening and smoothing of the edge slopes of $P_0(\rho)$. From a geometrical optics standpoint, the initial dependence $\rho(r)$ is transferred to $\rho'(r)$, where $\rho'$ is the corrected radial coordinate at the desired shaped plane of the DOE. Similarity with expression (7), the following is obtained $$\Delta\rho(r) = \rho'(r) - \rho = \frac{z}{k}\frac{d\varphi^{cor}(r)}{dr} \quad (9)$$

Then the corrective phase function is given by $$\varphi^{cor}(r) = \frac{k}{z}\int_0^r \Delta\rho(r)dr \quad (10)$$

Figure 9A:
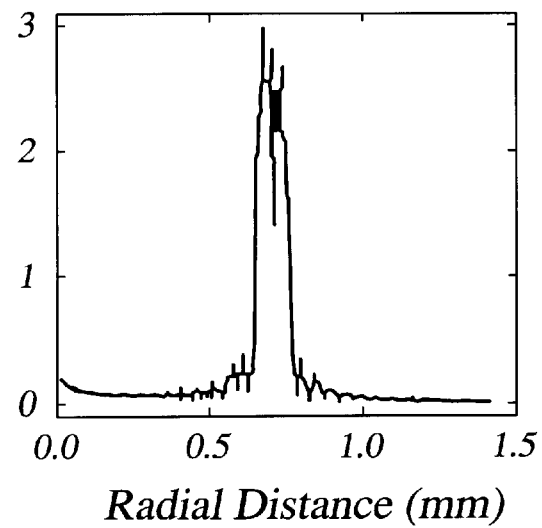
Figure 9B:
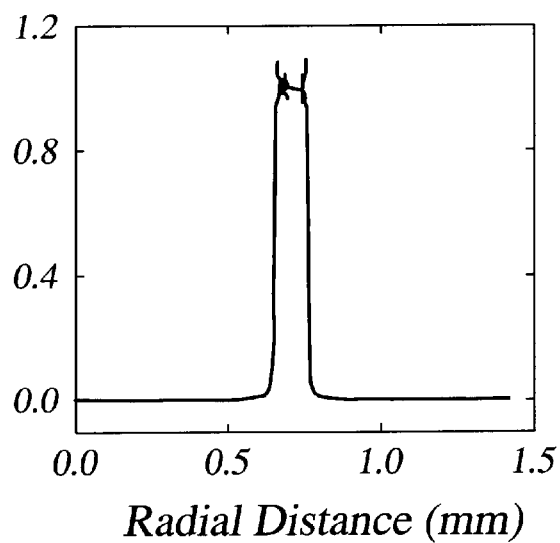
Figure 10A:
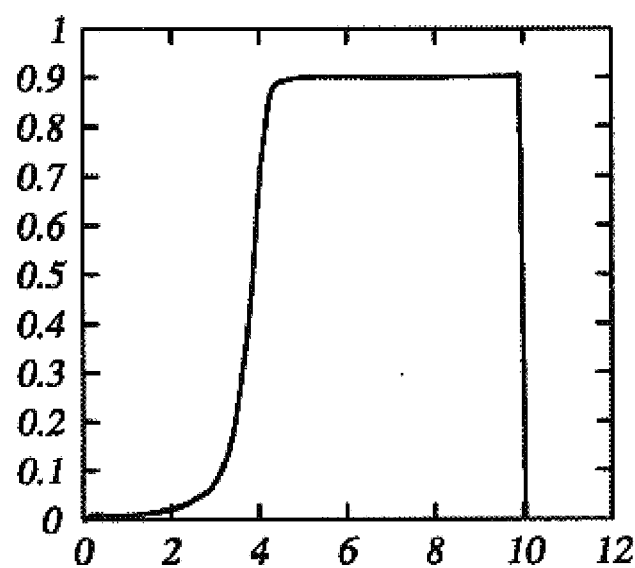
FIG. 10 shows (a) the radial amplitude distribution and (b) the three dimensional intensity profile obtained using a beam shaper designed by a novel optimization technique.
Figure 10B:
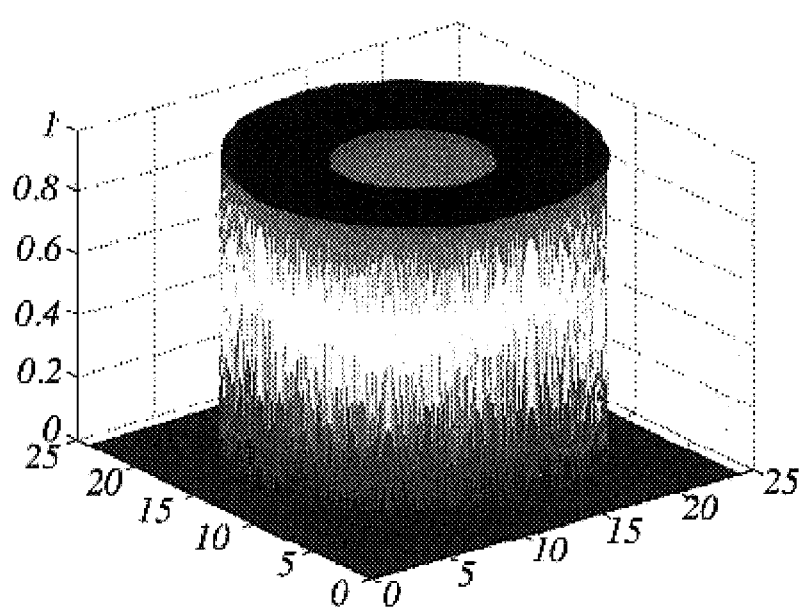

The beam shaper could be designed by conventional G-S or Y-G algorithms that are known in the art. Conversion results of Gaussian beams using DOEs designed by known techniques are shown in FIG. 9 where (a) shows the radial amplitude distribution using a G-S algorithm, and (b) the radial amplitude distribution using a Y-G algorithm. In comparison with these figures, FIG. 10 shows (a) the radial intensity distribution and (b) the 3D intensity profile using a beam shaper designed with the optimized method described above. As can be seen from FIG. 10(*a*) the oscillations have been removed and the diffraction efficiency can reach 92.16%. Furthermore, since the ray tracing approach is a non-iterative method it has better numerical efficiency than known methods and as a result a DOE with a large aperture (eg 24 mm×24 mm) can be designed.

What is claimed is:

1. A micropulse lidar system comprising, a laser light source for emitting a pulsed laser beam, beam shaping means external to the laser light source for shaping an intensity distribution of said beam such that said beam has a substantially annular intensity distribution in cross-section with a substantially zero intensity at a center thereof, a Schmidt-Cassegrain telescope for transmitting the annular beam to an atmospheric target and for collecting backscattered light returned from said target, means for detecting said backscattered light, and means for analyzing said detected backscattered light.

2. A micropulse lidar system as claimed in claim 1 further comprising beam expanding and collimating means located between said laser light source and said beam shaping means.

3. A micropulse lidar system as claimed in claim 1 wherein said detecting means comprises a photodiode.

4. A micropulse lidar system as claimed in claim 3 further comprising a beamsplitter for directing said collected backscattered light to said photodiode.

5. A micropulse lidar system as claimed in claim 4 wherein a narrow bandpass filter is provided between said beamsplitter and said photodiode.

6. A micropulse lidar system as claimed in claim 5 wherein said laser light source emits light at a wavelength of 532 nm and said bandpass filter has a central wavelength of 532 nm.

7. A micropulse lidar system as claimed in claim 3 wherein an output of said photodiode is captured and processed by a computer.

8. A micropulse lidar system as claimed in claim 1 wherein said laser light source emits pulses with a repetition rate of between 1 to 20 KHz and a pulse energy in a range of 1 to 50 $\mu$J.

9. A micropulse lidar system as claimed in claim 8 wherein said laser light source is a Nd:YAG laser that emits light at 532 nm.

10. A micropulse lidar system as claimed in claim 1 wherein said analyzing means comprises a computer.

* * * * *